United States Patent
Yasrebi et al.

(10) Patent No.: US 8,478,795 B2
(45) Date of Patent: *Jul. 2, 2013

(54) METHOD AND SYSTEM FOR AUTOMATICALLY DEFINING ORGANIZATIONAL DATA IN UNIFIED MESSAGING SYSTEMS

(75) Inventors: Mehrad Yasrebi, Austin, TX (US); James Jackson, Austin, TX (US); Timothy Schroeder, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/470,609

(22) Filed: May 14, 2012

(65) Prior Publication Data
US 2012/0226718 A1    Sep. 6, 2012

Related U.S. Application Data

(63) Continuation of application No. 12/334,968, filed on Dec. 15, 2008, now Pat. No. 8,200,716.

(51) Int. Cl.
*G06F 17/30* (2006.01)
*H04L 12/58* (2006.01)

(52) U.S. Cl.
CPC ..................... *H04L 12/58* (2013.01)
USPC ........... 707/804; 707/748; 707/758; 707/791; 707/811

(58) Field of Classification Search
CPC ....................................................... H04L 12/58
USPC ................. 707/804, 748, 758, 791, 793, 802, 707/803, 811, 100, 104; 705/51
See application file for complete search history.

(56) References Cited

U.S. PATENT DOCUMENTS

| | | | |
|---|---|---|---|
| 4,837,798 A | 6/1989 | Cohen et al. | |
| 6,721,398 B1 | 4/2004 | Pitcher | |
| 6,738,458 B1 | 5/2004 | Cline et al. | |
| 7,139,761 B2 | 11/2006 | McKibben et al. | |
| 7,260,607 B2 | 8/2007 | Aktas et al. | |
| 7,305,079 B1 | 12/2007 | Forte | |
| 7,349,528 B2 | 3/2008 | Schmidt et al. | |
| 7,369,648 B1 | 5/2008 | Chang | |
| 7,433,925 B1 | 10/2008 | Shankar et al. | |
| 7,551,727 B2 | 6/2009 | Howell et al. | |
| 7,634,546 B1 | 12/2009 | Strickholm et al. | |
| 7,649,895 B2 * | 1/2010 | Kadar et al. | 370/396 |
| 7,756,945 B1 | 7/2010 | Andreessen et al. | |
| 7,830,867 B2 * | 11/2010 | Schneider et al. | 370/352 |
| 7,903,796 B1 * | 3/2011 | Kheradpir et al. | 379/88.17 |
| 7,934,148 B2 | 4/2011 | Bobo, II | |
| 8,195,205 B2 * | 6/2012 | Johnson et al. | 455/466 |
| 2005/0138031 A1 | 6/2005 | Wefers | |
| 2006/0013368 A1 | 1/2006 | LaBaw | |

(Continued)

*Primary Examiner* — Fred I Ehichioya
*Assistant Examiner* — Dangelino Gortayo
(74) *Attorney, Agent, or Firm* — Wolff & Samson, PC

(57) ABSTRACT

A method and system for automatically defining and provisioning organizational data in a unified messaging (UM) platform are disclosed. An adapter in a unified messaging platform connects to at least one client human resources database. Human resources information that is organized in an organizational hierarchy is retrieved from the human resources database, and hierarchical organizational data is automatically generated in the UM platform based on the organizational hierarchy of the human resources information retrieved from the human resources database. UM mailboxes are provisioned to messaging centers in the UM platform based on the hierarchical organizational data.

15 Claims, 4 Drawing Sheets

U.S. PATENT DOCUMENTS

| | | |
|---|---|---|
| 2007/0115922 A1 | 5/2007 | Schneider et al. |
| 2007/0233600 A1* | 10/2007 | McMahon ..................... 705/51 |
| 2008/0301084 A1 | 12/2008 | Demarest et al. |
| 2009/0094559 A1 | 4/2009 | Shoshan |
| 2009/0319913 A1 | 12/2009 | Serr et al. |

* cited by examiner

METHOD AND SYSTEM FOR AUTOMATICALLY DEFINING ORGANIZATIONAL DATA IN UNIFIED MESSAGING SYSTEMS

This application is a continuation of U.S. patent application Ser. No. 12/334,968, filed Dec. 15,2008, which is entirely incorporated herein by reference.

BACKGROUND OF THE INVENTION

The present invention relates generally to provisioning organizational definitions and more particularly to provisioning organizational definitions in a unified messaging platform environment.

Unified messaging is the integration of multiple (typically two or more) types of communication (e.g., email, voicemail, short message service (SMS), fax, etc.) into a single, unified message store (e.g., a unified messaging platform) accessible from a variety of user devices. Unified messaging is typically provided by a service provider, which may be the same service provider that provides telephone service. In order for a service provider to provide unified messaging service to an organization of subscribers (also called users, which may be employees of a client organization), the unified messaging platform must be configured with organizational data regarding related groups in the client organization's organizational structure. Each client can be assigned his/her own unified messaging mailbox.

Conventionally, provisioning of business groups of a subscriber into the unified messaging platform is done manually using interactive software. Such software allows a client or the service provider to manually define organizational structures for the client organization in order to define mailboxes for individual users and to maintain group hierarchies in the client's organizational structure. Although this approach is effective, it requires the manual definitions of a client's organizations and groups into organizational data supported by the unified messaging platform. This can be tedious and error-prone. Furthermore, manually defining such organizational data can take a long time and be operationally expensive, particularly for larger businesses and organizations.

Accordingly, automatic definition of organizational data in a unified messaging platform is desirable.

BRIEF SUMMARY OF THE INVENTION

The present invention provides a method and system for automatically defining organizational data in a unified messaging platform environment.

In one embodiment of the present invention, an adapter in a unified messaging platform connects to at least one client human resources or equivalent database. Human resources information that is organized in an organizational hierarchy is retrieved from the human resources database, and hierarchical organizational data is automatically generated in the UM platform based on the organizational hierarchy of the human resources information retrieved from the human resources database.

These and other advantages of the invention will be apparent to those of ordinary skill in the art by reference to the following detailed description and the accompanying drawings.

DETAILED DESCRIPTION

Embodiments of the present invention are directed to an enhanced unified messaging (UM) system, in which organization data corresponding to an organizational hierarchy of a client is automatically provisioned.

Figure 1:
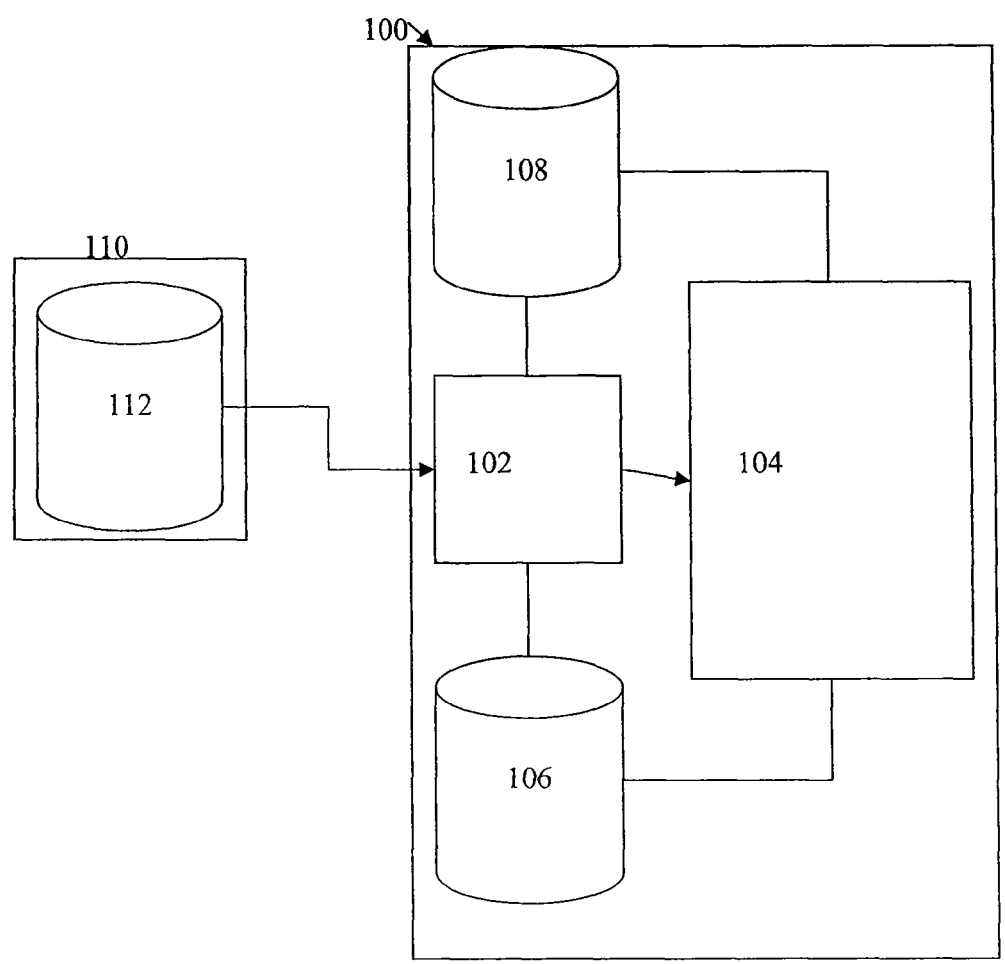
FIG. 1 illustrates a unified messaging system according to an embodiment of the present invention.

FIG. 1 illustrates a unified messaging system 100 according to an embodiment of the present invention. Unified messaging (UM) system 100 includes a UM platform 104 and an adapter 102 that automatically defines organizational data corresponding to an organizational structure of a customer (client) 110 in the UM platform 104. The adapter 102 interfaces with the client's 110 organizational databases, such as human resources database 112. The human resources database 112 stores entries corresponding to users (e.g., employees) associated with the client 110. The entries of the human resources database 112 are logically organized hierarchically according to a hierarchical organizational structure of the client 110, and include human resources information associated with the users, such as name, telephone number (TN), geographical location, group membership, device specifications, alternate devices that may be used in find me follow me (FMFM) scenarios, etc. Human resources databases are often linked with, or used as or in conjunction with telephone databases. Accordingly, the term "human resources database" is used herein to cover all such cases.

The adapter 102 retrieves the organizational hierarchy from the human resources database 112, and creates corresponding organizational data in the UM platform 104. For example, the adapter 102 can create Intermediate Logic Nodes (ILNs) and Communities of Interest (COIs) corresponding to the organizational hierarchy of the human resources information stored in the human resources database 112. In the UM platform 104, a COI is group that shares one or more common attributes. For example, a group of employees located at a particular geographical branch of a business, or a group of employees who report to the same supervisor can be grouped into a COI. An ILN is an organizational designation for which there are one or more COIs. For example, an ILN of location can have multiple COIs, each COI corresponding to a particular geographical branch of a business. As another example, an ILN may be used to represent a branch location, and the COIs that are under that ILN may represent various departments in that location. It is to be understood, that the organizational structure of a particular organization or business can be organized according to various ILNs and COIs. An advantage of the UM system 100 of FIG. 1 is that the adapter 102 automatically reflects the organizational structure of information stored in the human resources database 122 in the ILNs and COIs created for the UM platform 104.

The adapter 102 can be implemented as a processor or controller executing software instructions for defining the organizational data. The adapter 102 can communicate with the UM platform 104 using a UM application programming interface (API). According to an advantageous embodiment, the adapter 102 can communicate with the UM platform 104 using a previously existing API used for defining organizational data. Accordingly, the adapter 102 can be seamlessly integrated into UM platforms already in use. The adapter 102 can communicate with the human resources database 112 using an API (e.g., abstracted, LDAP or SQL-based) associated with the human resources database 112. According to a possible implementation, the adapter 102 can be pre-designed to interface with the most common types of human resources databases, such as SAP, PeopleSoft, Intuit Payroll solutions, etc. According to another possible implementation, the adapter 102 may be custom-designed for any other types of human resources database used by a particular client.

The UM platform 104 includes multiple UM mailboxes located at one or more messaging centers (MCs). The UM interface 104 includes one or more server or server-like devices that can be implemented as computers, such as the computer 200 discussed below with respect to FIG. 4. The MCs can be provided at various geographic locations. Each user of the UM platform 104 is assigned a mailbox. Mailboxes assigned to users grouped within a COI are assigned to the same MC. The UM platform 104 may be coupled to or include the adapter 102 and/or a UM database 106. The UM platform 104 stores the organizational data, such as the ILNs and the COIs, created by the UM adapter 102, into the UM database 106. The UM database 106 and service provider database 108 may be combined and be part of one database, and may also be integrated with the UM platform 104.

When the adapter 102 derives the organizational data for the UM platform 104 corresponding to the human resources information in the human resources database 112, the UM platform 104 may automatically provision a mailbox for each user specified in the human resources information. The UM platform 104 assigns mailboxes associated with the users to MCs based on the COIs associated with the users, so that the UM mailboxes for all users associated with a COI are assigned to the same MC. In addition to the human resources information retrieved from the human resources database 112, the UM platform 104 can be provided with additional data from a service provider database 108 to influence the assignment of the COIs to various MCs. The service provider database 108 can be coupled to or included in the UM platform 104, or can he maintained by a service provider separately from the UM platform 104. The service provider database 108 can include information such as geographical locations of users, local access and transport area (LATA) definitions, call forwarding number (CFN) definitions, capacity constraints of existing UM MCs, etc. The UM platform 104 can utilize this information when assigning mailboxes of users associated with a COI to an MC.

Placements of logical organizational units (e.g., COIs) at MCs can be adjusted at any time. Illustratively, the following parameters can be provided by the UM platform 104 for automatic provisioning: (1) (NPA, NNX) tuple and the target MC name for mapping COIs to specific MCs. The mapping of the target MCs may be automatically conditioned on the capacity of available MCs, whereby a list of MCs is provided to overcome remaining capacity limitations; (2) CFN to MC mappings; and (3) Class of Service (COS) identification. It is to be understood that these parameters are exemplary, and other parameters may be provided as well.

The system of FIG. 1 can be implemented as a "turn key" operation with existing UM platforms to achieve virtually instantaneous group definitions and virtually no errors. Furthermore, the service provider can access the adaptor 102 and/or UM platform 104 in order to fine tune changes or modify group definitions. Programming and/or user interface access may also be given to the customer so that the customer can also modify or customize the group definitions.

Figure 2:
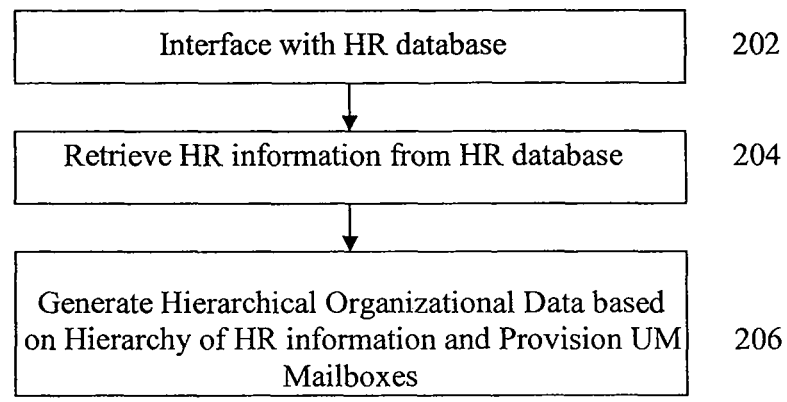
FIG. 2 illustrates a method for defining organizational data in a UM platform according to an embodiment of the present invention.

FIG. 2 illustrates a method 200 for defining organizational data in a UM platform according to an embodiment of the present invention. The method 200 of FIG. 2 automatically transforms human resources data representing entities (users) and an organizational structure of a business or organization into logical organizational units associated with the UM platform. As illustrated in FIG. 2, at step 202, a UM platform interfaces with a client's human resource (HR) database. For example, an adaptor of the UM platform can connect to or communicate with the HR database. When the adaptor is in communication with the HR database, these components can transmit signals and/or information to each other using any appropriate interfaces (e.g., SQL, LDAP, etc.) over any appropriate communication protocols. At step 204, the adapter of the UM platform retrieves HR information organized in an organizational hierarchy from the HR database. At step 206, hierarchical organizational data is automatically generated in the UM platform based on the organizational hierarchy of the human resources information, and UM mailboxes are provisioned based on the hierarchical organizational data. For example, ILNs and COIs are automatically generated based on the organization structure of the human resources information. Mailboxes for users grouped in COIs are created and assigned to various MCs associated with the COIs.

Figure 3:
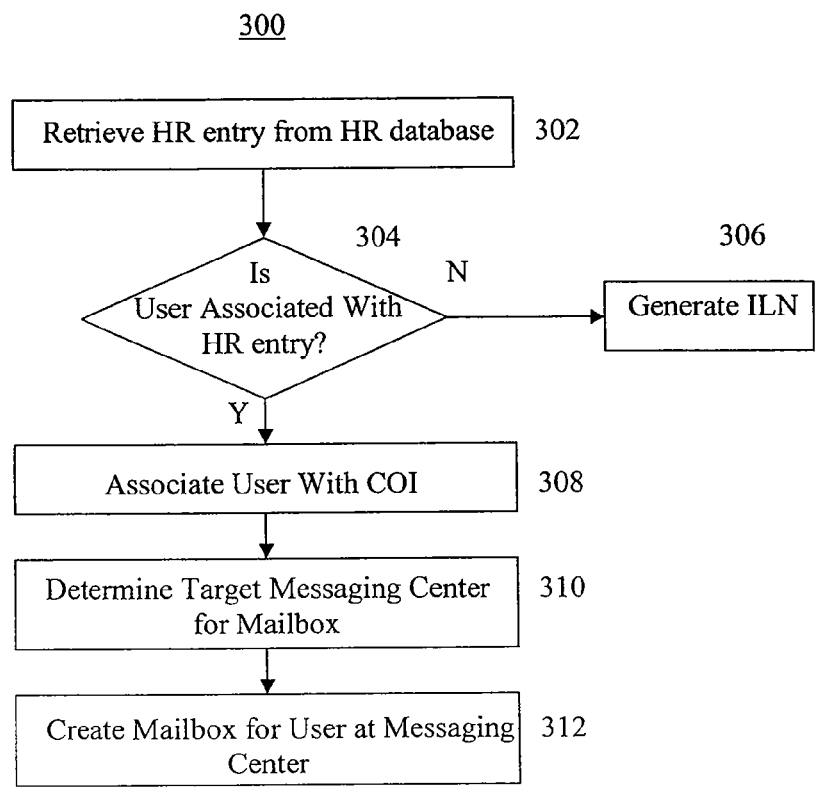
FIG. 3 illustrates a method for generating and provisioning hierarchical organizational data in a UM platform according to an embodiment of the present invention.

FIG. 3 illustrates a method 300 for generating and provisioning hierarchical organizational data in a UM platform according to an embodiment of the present invention. The method 300 of FIG. 3 can be used to implement steps 204 and 206 of the method of FIG. 2. The method 300 of FIG. 3 processes the HR information from the HR database entry by entry to generate organizational data corresponding to each entry in the UM platform. As illustrated in FIG. 3, at step 302, an HR entry is retrieved from the HR database. At step 304, it is determined whether a user (i.e., person) is associated with the HR entry. If there is no user associated with the HR entry, the method proceeds to step 306. If there is a user associated with the HR entry, the method proceeds to step 308.

At step 306, if there is no user associated with the HR entry, an ILN corresponding to the entry is generated. If there is no user associated with the entry, the entry represents an organizational entity, not an individual. An ILN representing the entity is generated and the name is used as the name of the ILN in the UM platform. The ILN may be created in all of the MCs of the UM platform without any associated mailboxes (as metadata, since mailboxes are associated with COIs). After the ILN is generated, the method proceeds to the next HR entry.

At step 308, if there is a user associated with the HR entry, the user (the HR entry) may be associated with a COI node. In particular, if a COI node does not yet exist for this organizational level, the COI node is created. Other users at the same organizational level may then be assigned to this COI node. If the appropriate COI node already exists, the user may be associated with the existing COI node.

At step 310, a target MC is determined for a user mailbox. At step 312, a mailbox may be created for the user at the determined MC. A configured UM input parameter can be used to assign he mailbox to a given MC. For example, the UM platform may provide the following data to adapter: (NPA, NNX)→MC name, LATA. Accordingly, based on the NPA and NNX of the TN associated with the user, the adapter assigns the user to a particular MC and LATA. If a capacity constraint of a configured MC is above a certain threshold, a list of other MCs in the LATA can be provided by the UM platform, and another configured MC can be used. This fact and the result of the operation are communicated to the UM platform. The MC name of the MC to which the mailbox is assigned can be used to drive the Call Forwarding Number (CFN) information for that MC. Accordingly, a CFN associated with the mailbox can be determined based on the assigned MC. The mailbox can be created for the user with the primary contact number of the user as the key to the mailbox creation (i.e., resulting in a Web Services API call createMailbox (TN, CFA, LATA, COS, . . . )). The user's name is mapped to the subscriber of that mailbox. Alternate device information may be, optionally, incorporated into the mailbox definition (e.g., for UM FMFM service).

As described above, the method of FIG. 3 generates and provisions organizational data in the UM platform corresponding to an HR entry. The method is repeated for all HR entries in the HR database. Accordingly, the graph (e.g., tree) of HR entries are automatically mapped into ILN and COI nodes in the UM platform by the adapter using predefined mappings provided by the UM platform. These template production rules can be customized for each organization. Schemas of HR databases are generally unique to each vendor, and maybe different for each business. Hence, column names, for example, may be unique for each business customer, while particular column names may or may not be the same as other customers of the same database vendor.

Figure 4:
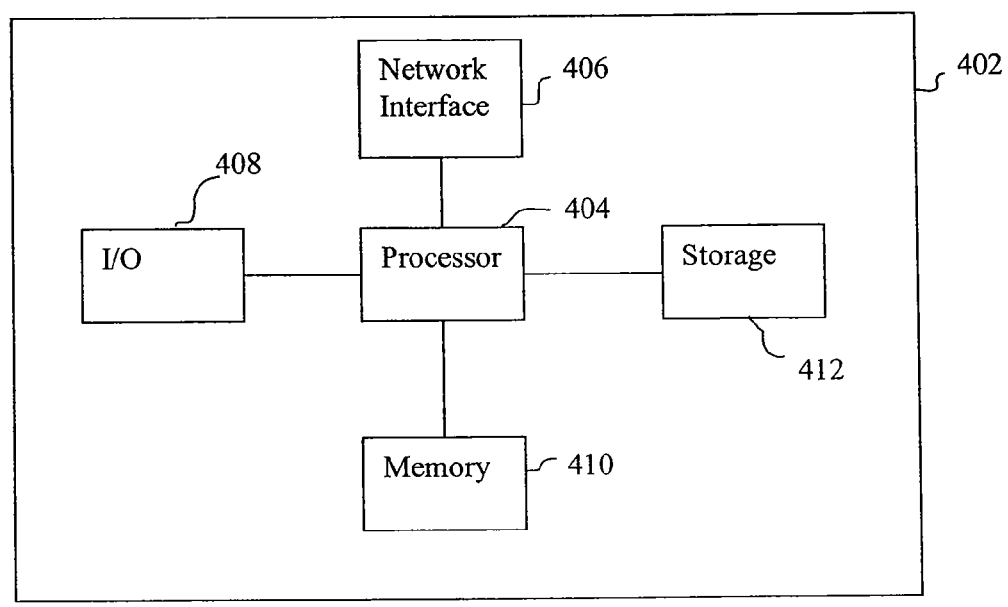
FIG. 4 is a high level block diagram of a computer capable of implementing the present invention.

The above described methods for defining and provisioning organizational data in a UM platform can be implemented on a computer using well-known computer processors, memory units, storage devices, computer software, and other components. A high-level block diagram of such a computer is illustrated in FIG. 4. Computer 402 contains a processor 404 which controls the overall operation of the computer 402 by executing computer program instructions which define such operation. The computer program instructions may be stored in a storage device 412, or other computer readable medium (e.g., magnetic disk, CD ROM, etc.), and loaded into memory 410 when execution of the computer program instructions is desired. Thus, the method steps of FIGS. 2 and 3 can be defined by the computer program instructions stored in the memory 410 and/or storage 412 and controlled by the processor 404 executing the computer program instructions. For example, the computer program instructions can be implemented as computer executable code programmed by one skilled in the art to perform an algorithm defined by the method steps of FIGS. 2 and 3. Accordingly, by executing the computer program instructions, the processor 404 executes an algorithm defined by the method steps of FIGS. 2 and 3. The computer 402 also includes one or more network interfaces 406 for communicating with other devices via a network. The computer 402 also includes input/output devices 408 that enable user interaction with the computer 402 (e.g., display, keyboard, mouse, speakers, buttons, etc.) One skilled in the art will recognize that an implementation of an actual computer could contain other components as well, and that FIG. 4 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. The various functional modules that are shown are for illustrative purposes only, and may be combined, rearranged and/or otherwise modified.

The invention claimed is:

1. A method comprising:
receiving a human resources information set comprising a first human resources database entry corresponding to a user and a second human resources database entry corresponding to an organizational designation;
receiving, from a service provider database, a geographic location of the user, a call forwarding definition associated with the user and a capacity associated with each one of a plurality of messaging centers;
automatically generating an intermediate logic node corresponding to the organizational designation;
automatically generating a community of interest node corresponding to the user,
the automatically generating a community of interest node comprising:
determining a particular messaging center among the plurality of messaging centers for a unified messaging mailbox for the user, the
determining based on a capacity associated with the particular messaging center and the geographic location of the user; and
provisioning the unified messaging mailbox for the first human resources database entry corresponding to the user,
wherein the unified messaging mailbox is associated with the particular messaging center, and the particular messaging center is associated with the intermediate logic node.

2. The method of claim 1, further comprising:
provisioning, in a common messaging center, the unified messaging mailbox for each of a plurality of users grouped in the community of interest node.

3. The method of claim 1, further comprising:
storing, in a unified messaging platform, a name of the first human resources database entry corresponding to the user as a name of the intermediate logic node.

4. The method of claim 1, further comprising:
creating the intermediate logic node in the plurality of messaging centers without any associated mailboxes.

5. The method of claim 1, wherein the automatically generating a community of interest node further comprises:
determining a call forwarding number for the unified messaging mailbox based on the particular messaging center, the call forwarding definition and the geographic location of the user.

6. A system comprising:
a processor; and
a memory to store computer program instructions, the computer program instructions;
when executed on the processor cause the processor to perform operations comprising:
receiving a human resources information set comprising a first human resources database entry corresponding to a user and a second human resources database entry corresponding to an organizational designation;
receiving, from a service provider database, a geographic location of the user, a call forwarding definition associated with the user and a capacity associated with each one of a plurality of messaging centers;
automatically generating an intermediate logic node corresponding to the organizational designation;

automatically generating a community of interest node corresponding to the user, the automatically generating a community of interest node comprising:
  determining a particular messaging center among the plurality of messaging centers for a unified messaging mailbox for the user, the determining based on a capacity associated with the particular messaging center and the geographic location of the user; and
  provisioning the unified messaging mailbox for the first human resources database entry corresponding to the user,
  wherein the unified messaging mailbox is associated with the particular messaging center, and the particular messaging center is associated with the intermediate logic node.

7. The system of claim 6, the operations further comprising:
provisioning, in a common messaging center, the unified messaging mailbox for each of a plurality of users grouped in the community of interest node.

8. The system of claim 6, the operations further comprising:
storing, in a unified messaging platform, a name of the first human resources database entry corresponding to the user as a name of the intermediate logic node.

9. The system of claim 6, the operations further comprising:
creating the intermediate logic node in the plurality of messaging centers without any associated mailboxes.

10. The system of claim 6, wherein the automatically generating a community of interest node further comprises:
determining a call forwarding number for the unified messaging mailbox based on the particular messaging center, the call forwarding definition and the geographic location of the user.

11. A non-transitory computer readable medium storing computer program instructions, which, when executed on a processor, cause the processor to perform operations comprising:
receiving a human resources information set comprising a first human resources database entry corresponding to a user and a second human resources database entry corresponding to an organizational designation;
receiving, from a service provider database, a geographic location of the user, a call forwarding definition associated with the user and a capacity associated with each one of a plurality of messaging centers;
automatically generating an intermediate logic node corresponding to the organizational designation;
automatically generating a community of interest node corresponding to the user, the automatically generating a community of interest node comprising:
  determining a particular messaging center among the plurality of messaging centers for a unified messaging mailbox for the user, the determining based on a capacity associated with the particular messaging center and the geographic location of the user; and
  provisioning the unified messaging mailbox for the first human resources database entry corresponding to the user,
  wherein the unified messaging mailbox is associated with the particular messaging center, and the particular messaging center is associated with the intermediate logic node.

12. The non-transitory computer readable medium of claim 11, the operations further comprising:
provisioning, in a common messaging center, the unified messaging mailbox for each of a plurality of users grouped in the community of interest node.

13. The non-transitory computer readable medium of claim 11, the operations further comprising:
storing, in a unified messaging platform, a name of the first human resources database entry corresponding to the user as a name of the intermediate logic node.

14. The non-transitory computer readable medium of claim 11, the operations further comprising:
creating the intermediate logic node in the plurality of messaging centers without any associated mailboxes.

15. The non-transitory computer readable medium of claim 11, wherein the automatically generating a community of interest node further comprises:
determining a call forwarding number for the unified messaging mailbox based on the particular messaging center, the call forwarding definition and the geographic location of the user.

* * * * *